United States Patent [19]

Herve

[11] Patent Number: 4,725,029
[45] Date of Patent: Feb. 16, 1988

[54] BRAKE BOOSTER MOUNTING ARRANGEMENT

[75] Inventor: Roland E. Herve, Colombes, France

[73] Assignee: General Motors Corporation, Detroit, Mich.

[21] Appl. No.: 914,997

[22] Filed: Oct. 3, 1986

[30] Foreign Application Priority Data

Oct. 4, 1985 [GB] United Kingdom ............... 8524569

[51] Int. Cl.⁴ ............................................. F16B 21/00
[52] U.S. Cl. .................................. 248/223.1; 403/348
[58] Field of Search .............. 248/221.3, 222.3, 222.4, 248/223.1, 223.2; 403/348, 353, 254

[56] References Cited

U.S. PATENT DOCUMENTS

| | | | |
|---|---|---|---|
| 924,334 | 6/1909 | Fouch | 403/353 |
| 1,748,433 | 2/1930 | Wetzell | 248/222.4 |
| 3,270,995 | 9/1966 | Shears | 248/222.4 |
| 3,332,655 | 7/1967 | Van Buren | 248/223.1 |
| 3,478,992 | 11/1969 | Raschke | 248/223.1 |
| 3,564,984 | 2/1971 | Alexander | 403/348 |
| 4,310,273 | 1/1982 | Kirrish | 411/338 |
| 4,317,416 | 3/1982 | Baum | 248/223.1 |
| 4,400,856 | 8/1983 | Tseng | 403/348 |
| 4,648,737 | 3/1987 | Lake | 403/348 |

FOREIGN PATENT DOCUMENTS

| | | | |
|---|---|---|---|
| 797732 | 7/1958 | United Kingdom | 248/222.4 |
| 1438195 | 6/1976 | United Kingdom | 403/348 |

Primary Examiner—J. Franklin Foss
Assistant Examiner—Robert A. Olson
Attorney, Agent, or Firm—D. D. McGraw

[57] ABSTRACT

A brake booster is mounted to the firewall of a vehicle in which shaped nuts or the like attached to the booster housing are passed through shaped apertures in the firewall, the brake booster is moved relative to the firewall to a secured mounting position, and resilient means biases a first portion of each nut or the like against the firewall. A finger formed as a part of the resilient means has a detent on the end thereof engaging an indentation in the firewall as the brake booster is moved to its secured mounting position, locking the brake booster in position on the firewall.

2 Claims, 8 Drawing Figures

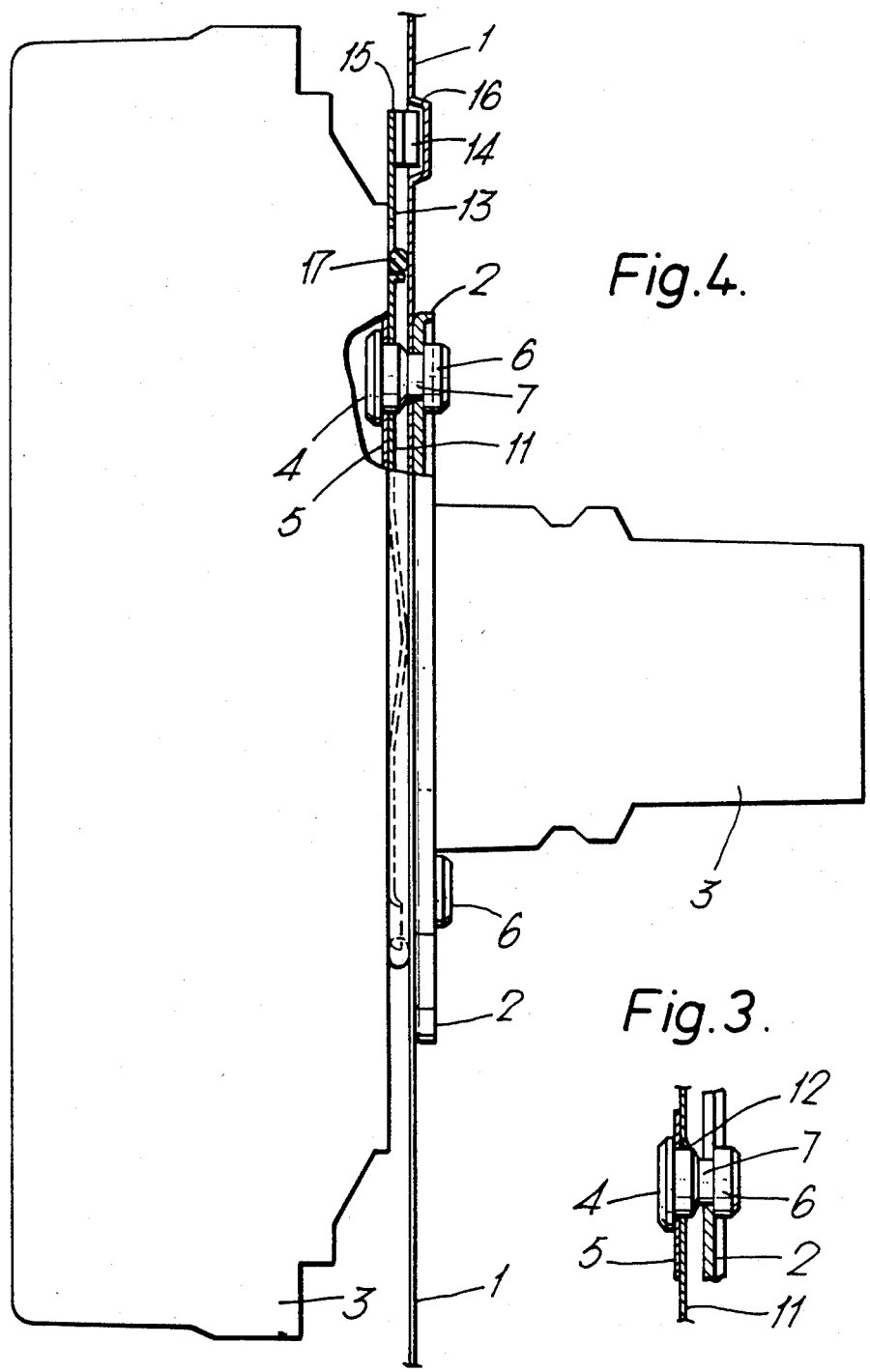

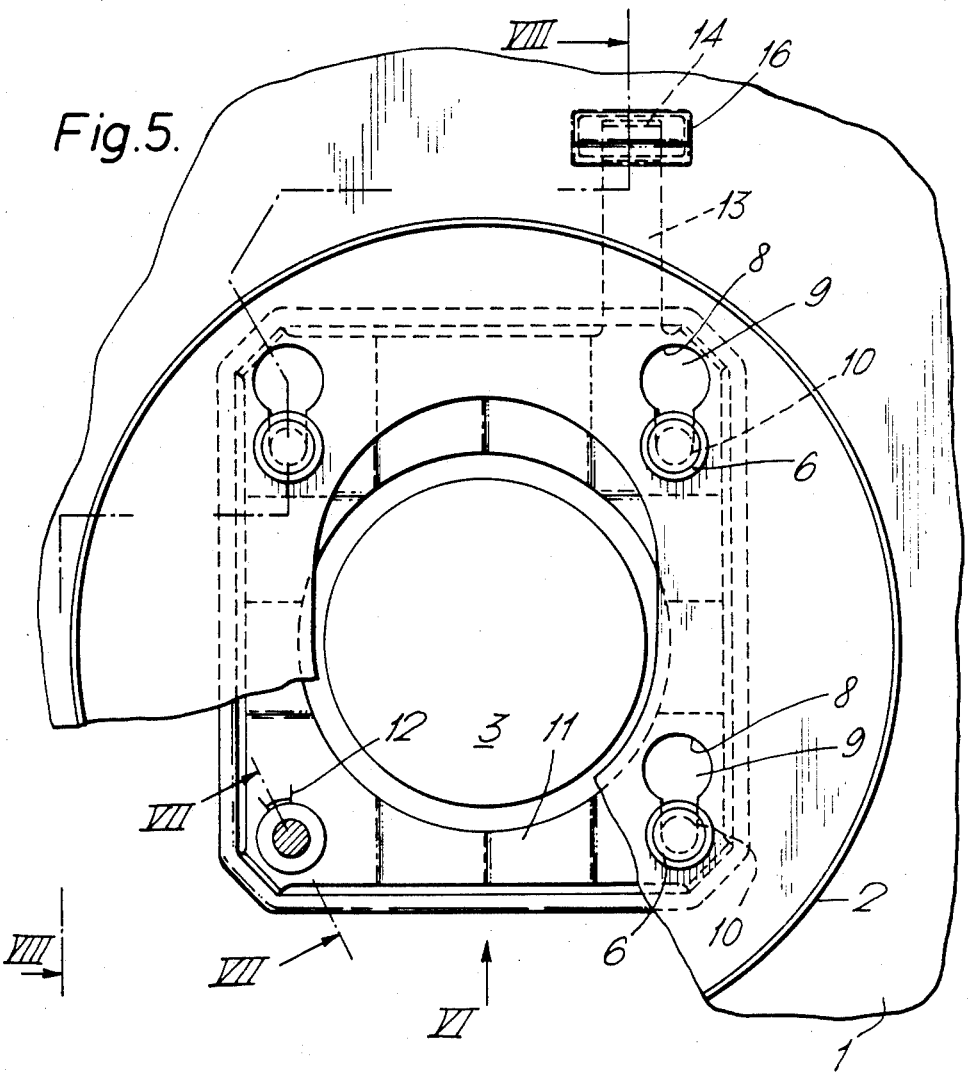
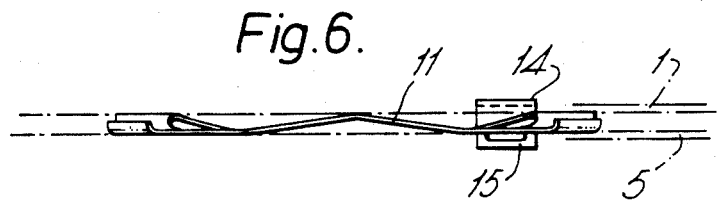

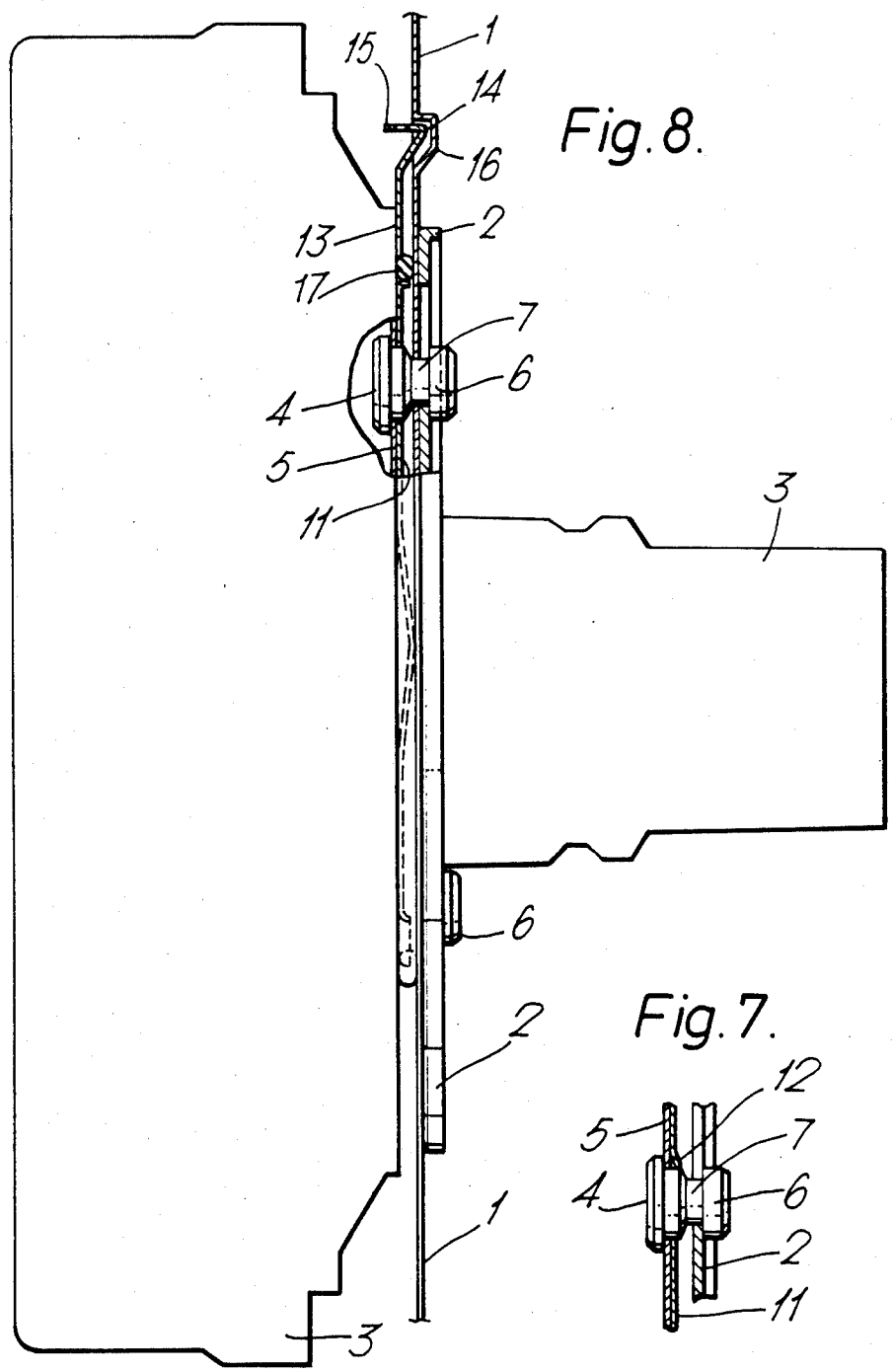

BRAKE BOOSTER MOUNTING ARRANGEMENT

Claim of priority based on British Application No. 8524569, filed Oct. 4, 1985.

The invention relates to an arrangement attaching a brake booster to the firewall of a vehicle, for example, an automobile, and more particularly to a mounting assembly therefor.

It has been the practice for a number of years to attach the brake booster to an automobile to the firewall by using nuts and bolts or threaded studs. This method, however, is very time consuming.

According to the present invention, a brake booster is mounted to the firewall of a vehicle by securing at least two shaped nuts to the housing of the brake booster, each nut having a first portion having a first diameter, and a second portion having a second diameter, the second portion being adjacent the first portion and the second diameter having a value less than that of the first diameter; passing the first portion of each nut through corresponding apertures in the firewall or in a mounting bracket secured to the firewall; each aperture comprising two regions, a first region having a diameter large enough to allow passage of the first portion of the nut through the aperture, and a second region having a diameter having a value greater than that of the second portion of the nut but less than that of the first portion of the nut, the second region opening into the first region; moving the brake booster relative to the firewall from the nut insertion position to a securing position such that the second portion of each nut moves into the second region of its corresponding aperture; and releasably locking the brake booster in the securing position.

Using this arrangement, the assembly time is considerably reduced as compared to typical stud through-bolt mounting arrangements in current use.

Preferably, the nuts are secured to the housing of the brake booster by welding. Alternatively, where the housing already has threaded studs secured to it, nuts having a threaded aperture may be used, the nuts being screw threaded to the studs.

Resilient means is preferably positioned on the opposite side of the firewall or mounting bracket to the first portion of each nut when the brake booster is in the securing position, the resilient means engaging the housing of the brake booster and the firewall or mounting bracket to resilient bias the first portion of each nut against the firewall or mounting bracket.

The resilient means may be in the form of a helical coil spring positioned around each nut. Preferably, however, the resilient means is in the form of a spring plate attached to the nuts. Where the nuts are welded to the housing, the spring plate is preferably attached to the nuts by passing the nuts through holes in the plate, at least one of the holes being so shaped and sized as to resiliently grip its corresponding nut. Where the nuts are screw threaded to studs on the housing, the spring plate is preferably attached by passing the studs through clearance holes in the plate and then screw threading the nuts to the studs to secure the spring plate to the housing.

Preferably the spring plate has an extending finger with a lip or detent at its free end which releasably latches in a corresponding opening or indentation in the firewall or mounting bracket when the brake booster is in the securing position to releasably lock the brake booster in the securing position.

Preferably there are four nuts, and the brake booster is moved relative to the firewall or mounting bracket by rotational movement. Alternatively, in this case, the relative movement may be lateral movement.

The invention is further described, by way of example, with reference to the accompany drawings in which:

FIG. 3 is a cross-sectional view with parts broken away, taken on the line III—III in FIG. 1;

FIG. 4 is a fragmentary cross-section view taken on the line IV—IV in FIG. 1; and FIGS. 5 to 8 are identical views of FIGS. 1 to 4 respectively of an alternative mounting arrangement in accordance with the invention.

Figure 1:
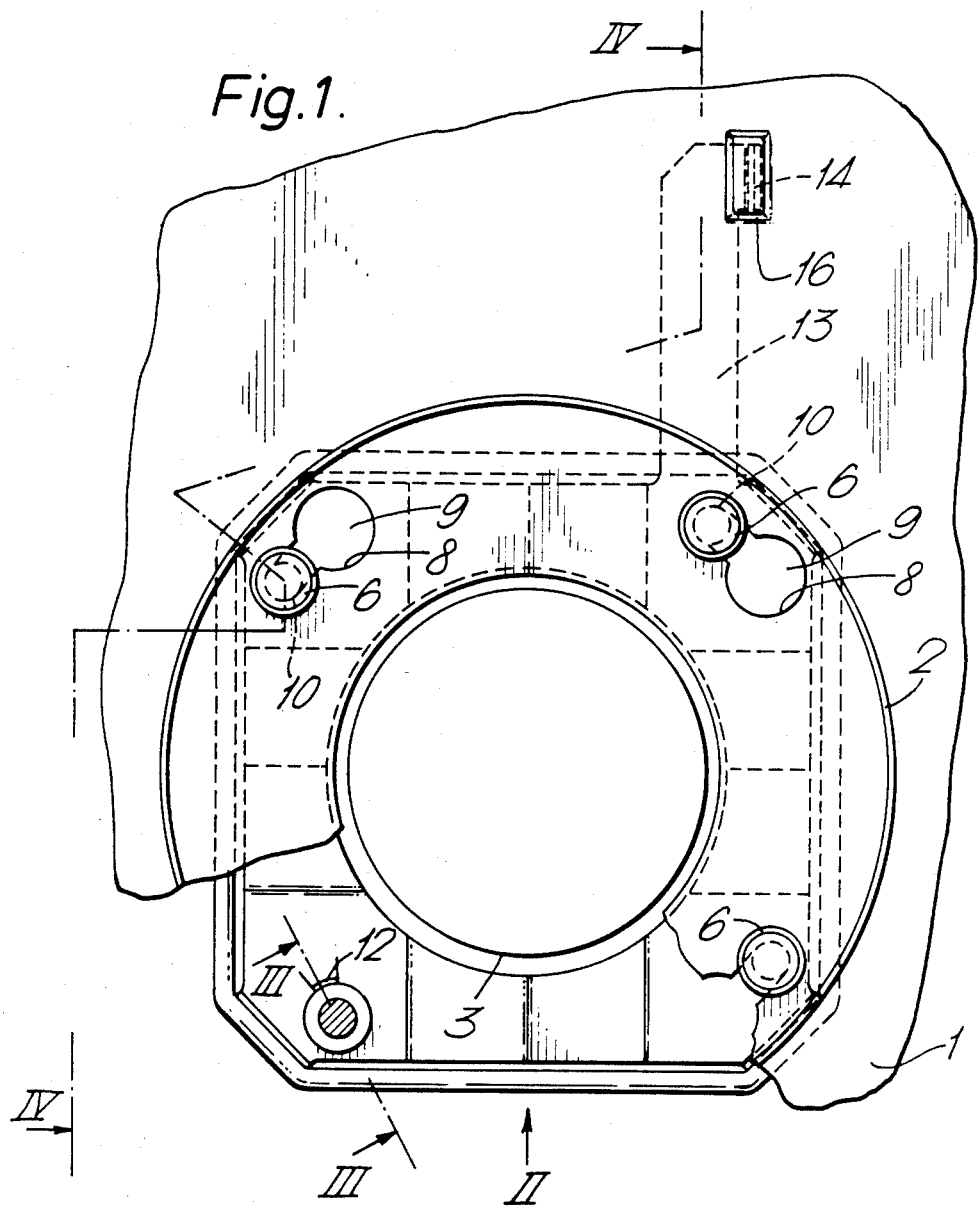
FIG. 1 is an end view, with parts broken away and in section, of a mounting assembly in accordance with this invention.
Figure 2:
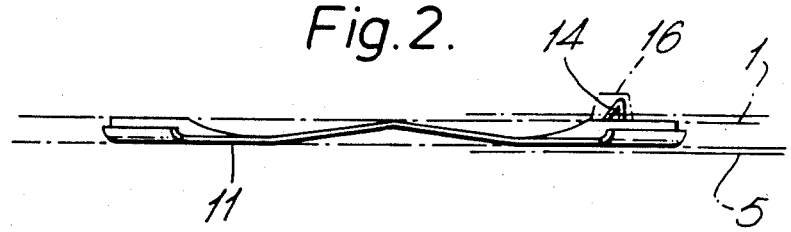
FIG. 2 is a view in the direction II in FIG. 1 of the spring plate of the assembly.

Referring to FIGS. 1 to 4, a firewall 1 of a vehicle is shown. The firewall 1 has a reinforcing plate 2, and a brake booster 3 is attached to the firewall. The brake booster 3 is attached by four nuts 4 which are preferably welded to the housing 5 of the brake booster. Each nut 4 has a first portion 6 having a first diameter and a second portion 7, adjacent the first portion, having a second diameter which is of lesser value than the value of the first diameter.

The first portion 6 of each nut 4 has been passed through a corresponding aperture 8 in the firewall 1 and reinforcing plate 2. Each aperture 8 has two regions, a first region 9 having a diameter large enough to allow passage of the first portion 6 of the nut 4 through the aperture, and a second region 10 having a diameter having a value greater than that of the second portion 7 of the nut, but less than that of the first portion of the nut, the second region opening into the first region.

The brake booster 3 is positioned by passing the first portion 6 of each nut 4 through the first region 9 of its corresponding aperture 8 and then rotating the brake booster relative to the firewall 1 to its securing position (as shown in FIG. 1) such that the second portion 7 of each nut moves into the second region 10 of its corresponding aperture.

Resilient means in the form of a spring plate 11 is positioned between the housing 5 of the brake booster 3 and the firewall 1, on the opposite side of the firewall to the first portion 6 of each nut 4, when the brake booster is in the securing position. The spring plate 11 biases the first portion 6 of each nut 4 against the reinforcing plate 3, and hence against the firewall 1. The spring plate 11 is secured to the housing 5 of the brake booster 3 by passing the nuts 4 through holes 12 in the plate 11, the holes being shaped and sized to resiliently grip the nuts.

The spring plate 11 also has an extending finger 13 with a lip or detent 14 at its free end 15. The detent 14 releasably latches in an indentation 16 in the firewall 1 when the brake booster 3 is in the securing position, to releasably lock the brake booster in position. The locking action can be disengaged (for removal of the brake booster 3) by bending the finger 13 to move the detent 14 out of the indentation 16. The brake booster 3 can then be rotated relative to the firewall 1 for removal.

An elastomeric O-ring 17 is positioned between the extending finger 13 and the firewall 1 to substantially prevent ingress of water into the firewall area, and to suppress noise and vibration.

FIGS. 5 to 8 show a similar arrangement in which similar parts have been given the same reference numbers. In this case, the brake booster 3 is laterally moved relative to the firewall 1 to secure the brake booster in position.

In alternative arrangements the brake booster may be attached to a mounting bracket which is secured to the firewall. Further, the nuts may be attached to the housing of the brake booster by screw threading to threaded studs attached to the housing. This latter arrangement allows previous designs of brake booster, which may already have threaded studs on them, to be attached to the firewall using this invention.

The embodiments of the invention in which an exclusive property or privilege is claimed are defined as follows:

1. For use in a vehicle having a brake booster mounted therein, a brake booster mounting arrangement comprising:

a booster mounting support wall forming a part of the vehicle, a brake booster having a housing, a plurality of shaped nut-like mounting members secured to said brake booster housing in circumferentially spaced relation, each of said nut-like mounting members having a first portion having a first diameter and a second portion having a second diameter, said second portion being adjacent said first portion and said second diameter having a value less than the value of said first diameter;

said booster mounting support wall having a center opening receiving a portion of said booster housing therethrough and detent-receiving means positioned radially outward of said center opening, said support wall also having apertures therein spaced circumferentially about said center opening corresponding to said nut-like mounting members, each of said apertures comprising a first region having a diameter large enough to allow passage therethrough and a second region having a diameter of a value greater than the value of said nut-like mounting member second portion second diameter but less than the value of said nut-like mounting member first portion first diameter, said second region opening into said first region;

said first region of each of said apertures being adapted to receive the first portion of one of said nut-like mounting members therethrough and then permit movement of said nut-like mounting members to a second position in which said second portion of each of said nut-like mounting members is then received within said second region of its corresponding aperture, said second position being the position thereof with the brake booster mounted in the vehicle;

resilient spring plate means surrounding said support wall center opening said spring plate means having circumferentially spaced openings through which said nut-like mounting members are received with said spring plate means being and positioned on and operatively secured to said nut-like mounting members and resiliently engaging said booster mounting support wall and said booster housing at alternate circumferentially spaced positions about said mounting wall opening and biasing said booster housing away from said booster mounting support wall and therefore biasing said spring nut-like mounting member first portions against the other side of said booster mounting support wall from said booster housing, said resilient means including at least one spring loaded arm extending outwardly therefrom between said booster housing and said support wall, said arm having a detent formed on the outer end thereof, said detent cooperating with said mounting support wall detent-receiving means to releasably lock said brake booster to said mounting support wall against rotation and in the secured position.

2. The brake booster mounting arrangement of claim 1 in which said mounting support wall is the vehicle firewall in combination with a mounting bracket secured to said firewall with said apertures being formed through said firewall and said mounting bracket.

* * * * *